United States Patent
Fujimoto et al.

[11] Patent Number: 5,866,891
[45] Date of Patent: Feb. 2, 1999

[54] TRANSMITTER-RECEIVER FOR NON-CONTACT IC CARD SYSTEM

[75] Inventors: Masahiro Fujimoto; Katsuhisa Orihara, both of Kanuma, Japan

[73] Assignee: Sony Chemicals Corp., Tokyo, Japan

[21] Appl. No.: 584,384

[22] Filed: Jan. 11, 1996

[30] Foreign Application Priority Data

Jan. 11, 1995 [JP] Japan .................................. 7-019826

[51] Int. Cl.⁶ ........................ G06K 5/00; G08B 13/187
[52] U.S. Cl. ................. 235/435; 235/380; 340/825.54; 340/825.72
[58] Field of Search .................. 235/435, 380; 340/825.54, 825.72

[56] References Cited

U.S. PATENT DOCUMENTS

| | | | |
|---|---|---|---|
| 3,816,709 | 6/1974 | Walton | 235/61.11 |
| 4,023,167 | 5/1977 | Wahlstrom | 343/17 |
| 4,388,524 | 6/1983 | Walton | 235/380 |
| 4,742,470 | 5/1988 | Juengel | 340/825.54 |
| 4,763,354 | 8/1988 | Fukushima et al. | 379/165 |
| 4,782,514 | 11/1988 | Oshikata et al. | 379/165 |
| 4,818,855 | 4/1989 | Mongeon et al. | 340/825.54 |
| 4,931,788 | 6/1990 | Creswick | 340/825.54 |
| 4,942,534 | 7/1990 | Yokoyama et al. | 364/468 |
| 5,113,184 | 5/1992 | Katayama | 238/382 |
| 5,214,409 | 5/1993 | Beigel | 340/825.54 |
| 5,289,506 | 2/1994 | Kitayama et al. | 375/97 |
| 5,357,091 | 10/1994 | Ozawa et al. | 235/380 |
| 5,418,353 | 5/1995 | Katayama et al. | 235/380 |
| 5,436,622 | 7/1995 | Gutman et al. | 340/825.46 |
| 5,471,203 | 11/1995 | Sasaki et al. | 235/382 |
| 5,561,420 | 10/1996 | Kleefeldt et al. | 340/825.54 |

FOREIGN PATENT DOCUMENTS

| | | | |
|---|---|---|---|
| 000585132 | 3/1994 | European Pat. Off. | 340/825.54 |
| 000593131 | 4/1994 | European Pat. Off. | 340/825.54 |
| 0 625 832 | 11/1994 | European Pat. Off. . | |
| 28 42 549 | 4/1980 | Germany . | |
| 28 42 590 | 4/1980 | Germany . | |
| 2077555 | 12/1981 | United Kingdom | 340/825.54 |
| 093015561 | 8/1993 | WIPO | 340/825.54 |

*Primary Examiner*—Anita Pellman Gross
*Assistant Examiner*—Douglas X. Rodriguez
*Attorney, Agent, or Firm*—Hill & Simpson

[57] ABSTRACT

In a non-contact IC card system which transmits and receives signals between an interrogator and a transponder, a transmitter-receiver used for the interrogator includes a carrier wave oscillator capable of sweeping an oscillation frequency, a resonant wave detector for detecting the resonant frequency of the transponder among carrier waves generated by the carrier wave oscillator, and a carrier frequency holder for maintaining the oscillation frequency of the carrier wave oscillator to the frequency detected by the resonant wave detector. The system is driven with a high transmission efficiency by bring the carrier wave frequency of the interrogator into agreement with the resonant frequency of the transponder, without lowering the Q value of the resonant circuit of the transponder and without any special adjustment for controlling the resonant frequency of the transponder to the desired frequency.

7 Claims, 3 Drawing Sheets

INTERROGATOR

TRANSPONDER

TRANSMITTER-RECEIVER FOR NON-CONTACT IC CARD SYSTEM

BACKGROUND OF THE INVENTION

1. Field of the Invention

This invention relates to a non-contact integrated circuit (hereinafter "IC") card system which transmits and receives signals between an interrogator (a reader-writer) and a transponder (a card), in particular, to a transmitter-receiver used for the interrogator.

2. Description of the Related Art

Non-contact IC card systems are well known which transmit and receive signals between an interrogator (a reader-writer) and a transponder (a card) by the electromagnetic coupling method or electromagnetic induction method.

FIG. 3 is a block diagram commonly used in such an electromagnetic coupling type non-contact IC card system. In the non-contact IC card system shown in FIG. 3, the interrogator modulates a carrier wave generated in an OSC (oscillator) 1, through a modulating circuit 3 in accordance with signals from a data-processing circuit 2, and the modulated wave is amplified in a constant-current driver circuit 4 and then transmitted to the transponder through constant-current drive of an antenna coil 5. The transponder receives signals from the interrogator through an antenna coil 11, whereupon the received signals are demodulated in a demodulating circuit 13 and are sent to a data-processing circuit 14. The data are processed in the data-processing circuit 14, and the preset data are sent to a modulating circuit 15 and then sent out to the interrogator through the antenna coil 11. The interrogator receives the signals sent from the transponder through the antenna coil 5, whereupon the signals are demodulated in a demodulating circuit 6 and then sent to the data-processing circuit 2 to process the data to make judgement or the like.

Now, in order to enhance the selectivity of signals sent from the interrogator, the transponder is provided with a tuned resonant circuit A comprised of the antenna coil 11 and a capacitor 12. The resonant frequency $f_0$ of this resonant circuit A depends on inductance L of the antenna coil 11 and capacitance C, and is determined by the formula:

$$f_0 = \frac{1}{2\pi \sqrt{LC}}$$

where $f_0$ is in hertz, L is in henrys, and C in farads. Thus, in order to obtain a desired resonant frequency, the antenna coil 11 and the capacitor 12 are required to have the desired inductance and capacitance.

However, the precision of capacitance of the capacitor 12 is about plus-minus 5% at best. Also, as the form of the antenna coil 11, it can be roughly grouped into two types, one of which is of the type of a wound wire and the other of which is of the type of an etched copper-clad plate. Of these, the precision of inductance of the wound wire type is about plus-minus 5%. Hence, there is a limit on the improvement in the precision of the resonant frequency $f_0$ and an error of about plus-minus 5% usually occurs between the carrier wave frequency of the interrogator and the resonant frequency of the transponder.

Meanwhile, in order to efficiently convert into voltage the magnetic field induced in the antenna coil 11, it is more preferable for the resonant circuit to have a higher Q (quality factor). However, making the Q of the resonant circuit A higher results in a narrow frequency bandwidth selected in the resonant circuit A. Hence, if the Q is made too high, the frequency selected in the resonant circuit A turns outside the range of the tolerance between the carrier wave frequency of the interrogator and the resonant frequency of the transponder, thereby causing the problems that the signals from the interrogator can not be received.

Accordingly, the Q of the resonant circuit A is intentionally lowered to the extent that the error between the carrier wave frequency of the interrogator and the resonant frequency of the transponder does not come into question.

Alternatively, in order to set the resonant frequency of the transponder to have the desired frequency, a special adjustment is made when the transponder is manufactured. That is, a plurality of capacitors are provisionally provided as the capacitor 12 of the resonant circuit A, and some unnecessary capacitors are removed at the time of the adjustment so that the desired resonant frequency $F_0$ can be obtained, or a troublesome operation is made, e.g., the antenna coil 11 is unwound at the time of the adjustment.

SUMMARY OF THE INVENTION

This invention settles the problems in the prior art as discussed above. An object of the present invention is to enable efficient transmission by bringing the carrier wave frequency of the interrogator into agreement with the resonant frequency of the transponder, without lowering the Q of the resonant circuit A of the transponder and also without any special adjustment for controlling the resonant frequency of the transponder to the desired frequency.

The present inventors have discovered that the above object can be achieved when the interrogator is made to have the function to detect the resonant frequency of the transponder so that the carrier wave frequency of the interrogator is maintained to the frequency thus detected. They have thus accomplished the present invention.

The invention provides a transmitter-receiver used for an interrogator in a non-contact IC card system which transmits and receives signals between the interrogator and a transponder; the transmitter-receiver comprising;

a carrier wave oscillating means capable of sweeping an oscillation frequency;

a resonant wave detecting means for detecting the resonant frequency of the transponder among carrier waves generated by the carrier wave oscillating means; and a carrier frequency holding means for maintaining the oscillation frequency of the carrier wave oscillating means to the frequency detected by the resonant wave detecting means.

In the present invention, the carrier wave oscillating means generates a carrier wave while sweeping an oscillation frequency. The carrier wave whose frequency is being swept is transmitted to the transponder, where the impedance of the transponder viewed from the interrogator greatly changes when the carrier wave frequency of the interrogator has come into agreement with the resonant frequency of the transponder, so that a peak voltage (or a dip voltage) is generated in the antenna of the interrogator. Thus, in the present invention, a carrier wave with a specific frequency which generates this peak voltage (or dip voltage) is detected so that the oscillation frequency of the carrier wave oscillating means is maintained to the specific frequency by the carrier frequency holding means.

Thereafter, the signals from the data-processing circuit of the interrogator are modulated with the carrier wave having the specific frequency maintained by the carrier wave oscillating means, and the signals thus modulated are sent to the transponder as in the conventional non-contact IC card system. In this instance, since the frequency of the carrier wave is in agreement with the resonant frequency of the transponder, the transponder can receive the signals in a high signal transmission efficiency.

DETAILED DESCRIPTION OF THE INVENTION

The present invention will be specifically described below by giving a preferred embodiment.

Figure 1:
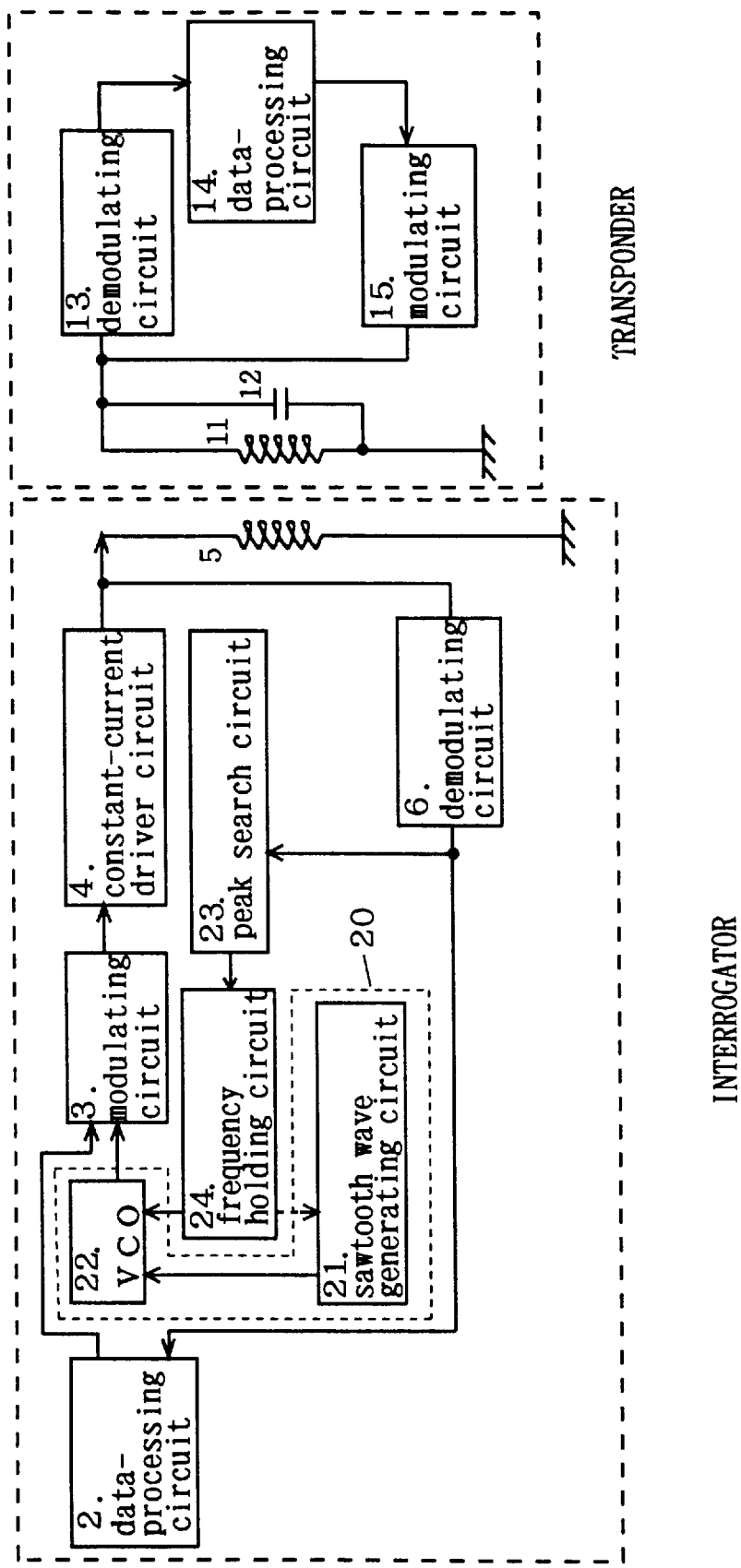
FIG. 1 is a block diagram of a non-contact IC card system employing as the interrogator a device according to an embodiment of the present invention.
Figure 2A:
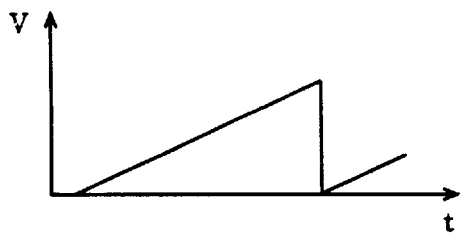
FIGS. 2A to 2D show waveforms in the circuits of the non-contact IC card system according to the present invention.
Figure 2B:
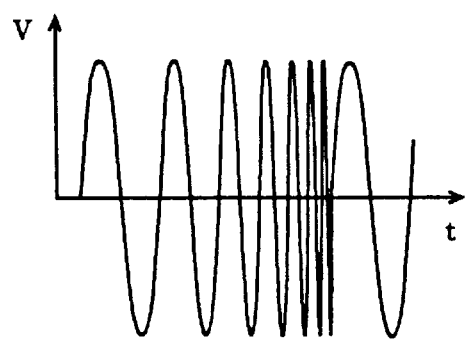
Figure 2C:
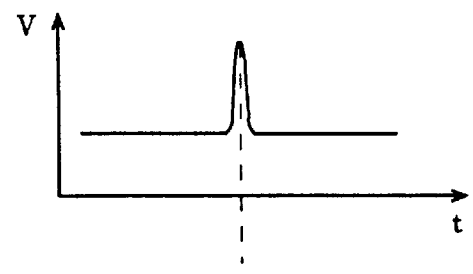
Figure 2D:
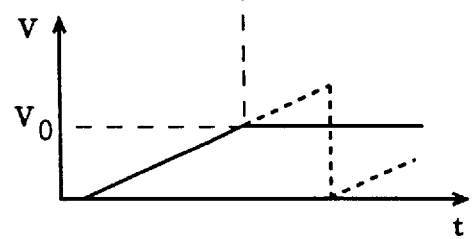
Figure 3:
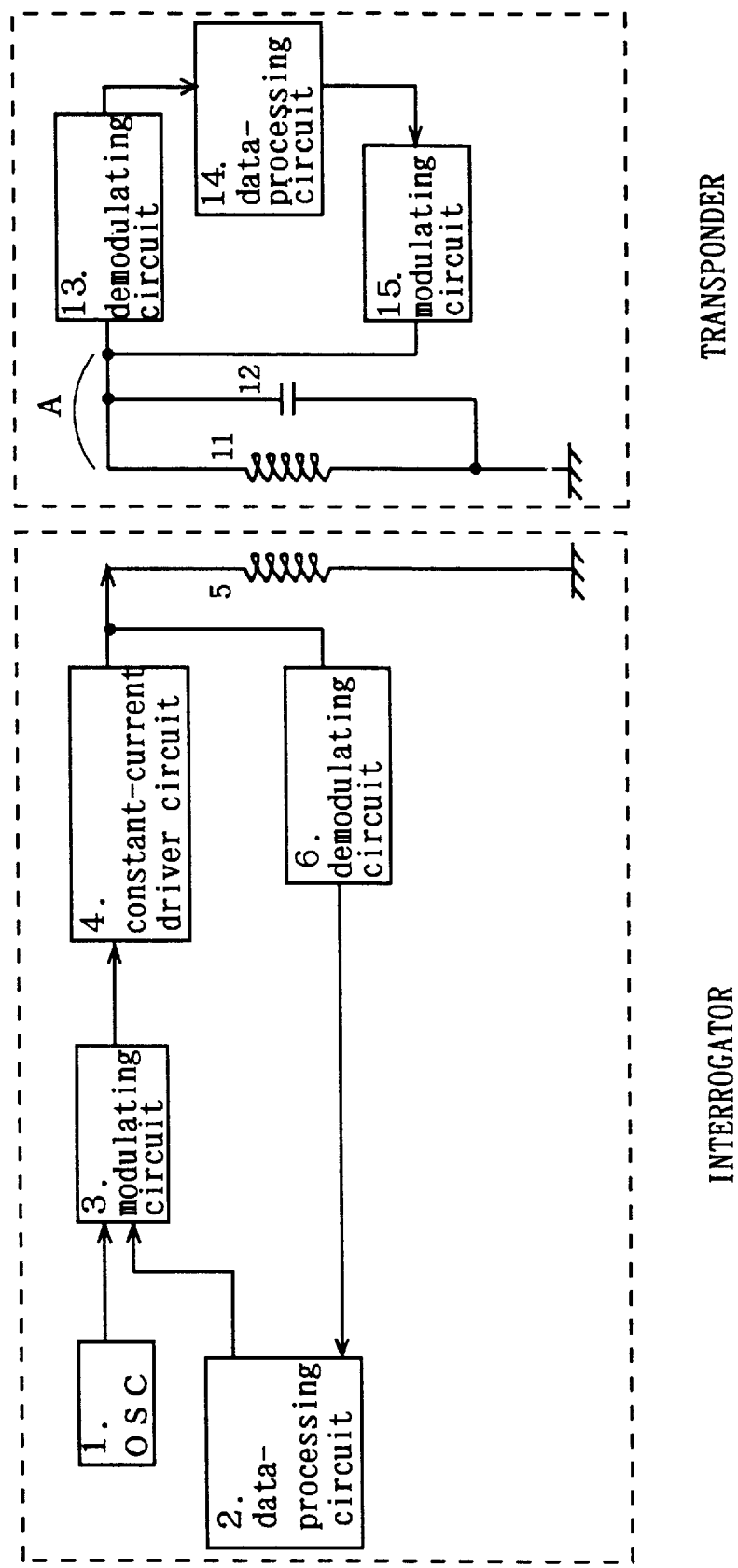
FIG. 3 is a block diagram of a conventional non-contact IC card system.

FIG. 1 is a block diagram of a non-contact IC card system in which an interrogator comprising the device according to an embodiment of the present invention is set up in combination with the conventional transponder shown in FIG. 3. FIGS. 2A to 2D show waveforms in the circuits of this non-contact IC card system.

Like the conventional interrogator shown in FIG. 3, the interrogator shown in FIG. 1 has a data-processing circuit 2, a modulating circuit 3, a constant-current driver circuit 4, an antenna coil 5, and a demodulating circuit 6. The signals from the data-processing circuit 2 modulate a carrier wave in the modulating circuit 3, and the modulated wave is amplified in the constant-current driver circuit 4 and then transmitted to the transponder through the antenna coil 5. The signals received from the transponder are demodulated in the demodulating circuit 6 and are sent to the data-processing circuit 2 to process the data to make judgement or the like. These are common to the conventional one.

However, the interrogator shown in FIG. 1 is different in that it has a saw-tooth wave generating circuit 21 and a voltage control oscillating circuit (VCO) 22, which constitute a carrier wave oscillating means 20, and is also different in that it has a peak search circuit 23 and a frequency holding circuit 24. This peak search circuit 23 constitutes together with the demodulating circuit 6 a resonant wave detecting means for detecting the resonant frequency of the transponder. Also, the frequency holding circuit 24 is connected to the voltage control oscillating circuit 22 as shown by a solid line in the drawing, or connected to the saw-tooth wave generating circuit 21 as shown by a broken line in the drawing, to constitute the carrier frequency holding means.

In this interrogator, when data are transmitted to and received from the transponder and before the signals from the data-processing circuit 2 of the interrogator are modulated, the frequency of the carrier wave is first determined in the following way: A saw-tooth wave as shown in FIG. 2A is generated by the saw-tooth wave generating circuit 21. By this saw-tooth wave, a carrier wave whose frequency is swept as shown in FIG. 2B is generated by the voltage control oscillating circuit 22. This carrier wave is transmitted to the transponder after it has been modulated, or without being modulated, in the modulating circuit 3. Here, the impedance of transponder as viewed from the interrogator greatly changes when the carrier wave frequency of the interrogator has come into agreement with the resonant frequency of the resonant circuit A of the transponder. As the result, a peak voltage (or a dip voltage) is generated at both ends of the antenna coil 5. Hence, when, for example, the peak voltage is generated in the antenna coil 5, the demodulating circuit 6 demodulates as shown in FIG. 2C the changes in voltage at the both ends of the antenna coil 5, containing the peak voltage. The peak search circuit 23 detects the peak frequency of this peak waveform and sends out a trigger pulse to the frequency holding circuit 24. The frequency holding circuit 24 maintains the drive voltage of the voltage control oscillating circuit 22 or saw-tooth wave generating circuit 21 to a constant voltage $V_0$ as shown in FIG. 2D. Thus, thereafter, the voltage control oscillating circuit 22 maintains the oscillation of a carrier wave having a constant frequency, oscillating at that voltage $V_0$. The carrier wave determined in this way comes into agreement with the resonant frequency of the transponder.

After the frequency of the voltage control oscillating circuit 22 has been determined in this way, the signals sent from the data-processing circuit 2 modulate this carrier wave. The signals thus modulated are amplified in the constant-current driver circuit 4 and then sent to the transponder through the antenna coil 5. In this instance, since the frequency of the carrier wave is in agreement with the resonant frequency of the transponder, the transponder can receive the signals in a high signal transmission efficiency.

In the foregoing, one embodiment of the present invention has been described with reference to the drawings. Besides this embodiment, the present invention may take various modes. For example, in the interrogator shown in FIG. 1, the carrier wave oscillating means 20, which has the saw-tooth wave generating circuit 21 and the voltage control oscillating circuit (VCO) 22, may be any oscillating means in the present invention so long as it can sweep the oscillation frequency. Thus, in place of the saw-tooth wave generating circuit 21, a step-form wave generating circuit or the like may be used.

The present invention can also be widely applied in interrogators of electromagnetic coupling type or electromagnetic induction type non-contact IC card systems. Thus, while an example in which the antenna coil 5 is fed through the constant-current driver circuit 4 is given in the embodiment described above, the present invention can also be applied in an instance where the antenna coil 5 is fed through a constant-voltage driver circuit or the like.

As described above in detail, the present invention makes it possible to bring the carrier wave frequency of the interrogator into agreement with the resonant frequency of the transponder, without any special adjustment for controlling the resonant frequency of the transponder to the desired frequency. Hence, it becomes unnecessary to lower the Q of the resonant circuit A of the transponder. Thus, it becomes possible to drive the non-contact IC card system in a high signal transmission efficiency and with ease.

What is claimed is:

1. A transmitter-receiver used for an interrogator in a non-contact IC card system which transmits and receives signals between the interrogator and a transponder said transmitter-receiver comprising:

a carrier wave oscillating means capable of sweeping an oscillation frequency;

a resonant wave detecting means for detecting a single resonant frequency of the transponder among carrier waves generated by the carrier wave oscillating means;

a carrier frequency holding means for maintaining the oscillation frequency of the carrier wave oscillating means at said single resonant frequency detected by the resonant wave detecting means; and means for transmitting data between the interrogator and the transponder at said single resonant frequency.

2. The transmitter-receiver for a non-contact IC card system according to claim 1, wherein said carrier wave oscillating means comprises a saw-tooth wave generating circuit and a voltage control oscillating circuit.

3. A transmitter receiver as claimed in claim 1, wherein said carrier frequency holding means is connected to said carrier wave oscillating means to halt sweeping of the oscillation frequency upon detection of the resonant frequency so that the frequency of the interrogator is matched to the frequency of the transponder.

4. A transmitter receiver as claimed in claim 3, further comprising:

a data source means in the transponder for modulating a carrier signal of the resonant frequency in accordance with a data signal; and a data receiving means in the interrogator for receiving the carrier signal modulated by the data signal and detecting the data signal therefrom after the frequency of the interrogator is matched to the frequency of the transponder.

5. A method for matching a frequency of an interrogator to a frequency of a transponder in a transmitter-receiver arrangement, comprising:

varying a carrier frequency of the interrogator;

locating the transponder within a signal coupling range of the interrogator;

detecting a peak signal in said interrogator which corresponds to a single resonant frequency in the transponder;

holding the carrier frequency of the interrogator at the single resonant frequency upon detection of the peak signal; and transmitting data between the transponder and the interrogator while the interrogator holds the carrier frequency of the transponder at said single resonant frequency.

6. A method as claimed in claim 5, wherein said step of varying the frequency of the interrogator sweeps the frequency repeatedly through a range until held in said holding step.

7. A method as claimed in claim 6, wherein said step of varying the frequency includes generating a saw-tooth signal.

* * * * *